July 15, 1930. W. R. GWATHMEY 1,770,737
INSECT TRAP
Filed Aug. 20, 1929   2 Sheets-Sheet 1
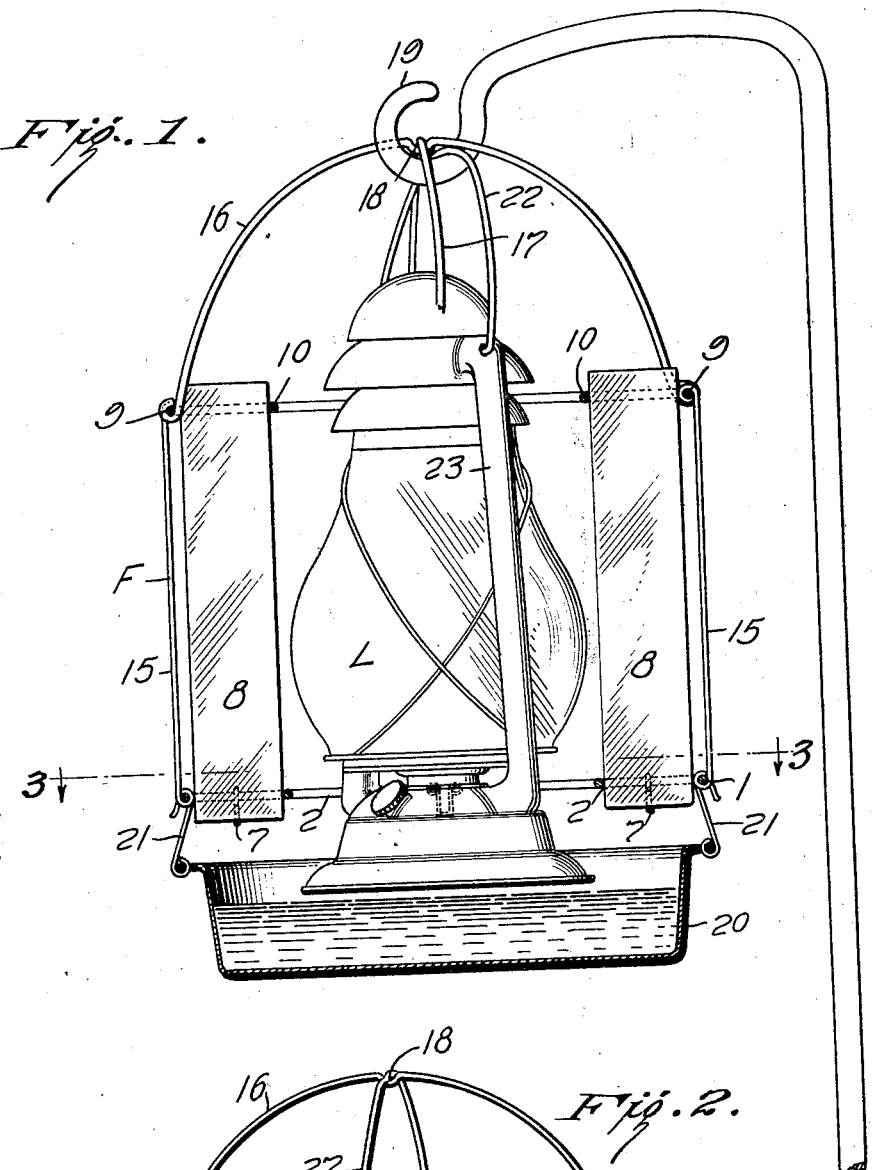
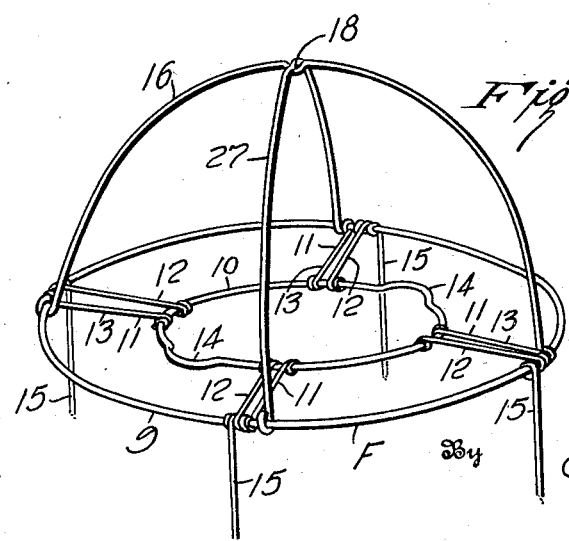
Inventor
WILLIAM R. GWATHMEY,
By Frank B. Hoffman
Attorney July 15, 1930. W. R. GWATHMEY 1,770,737
INSECT TRAP
Filed Aug. 20, 1929 2 Sheets-Sheet 2
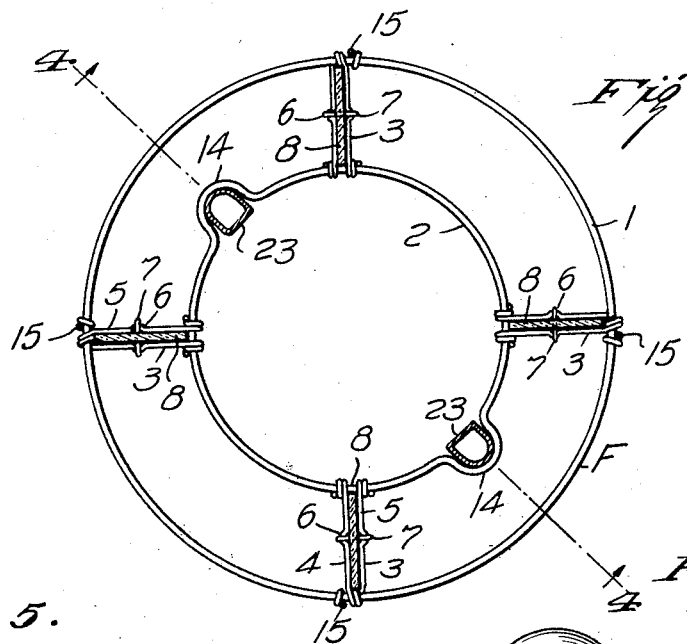
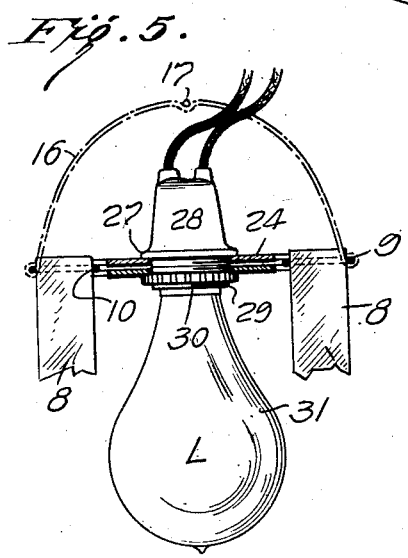
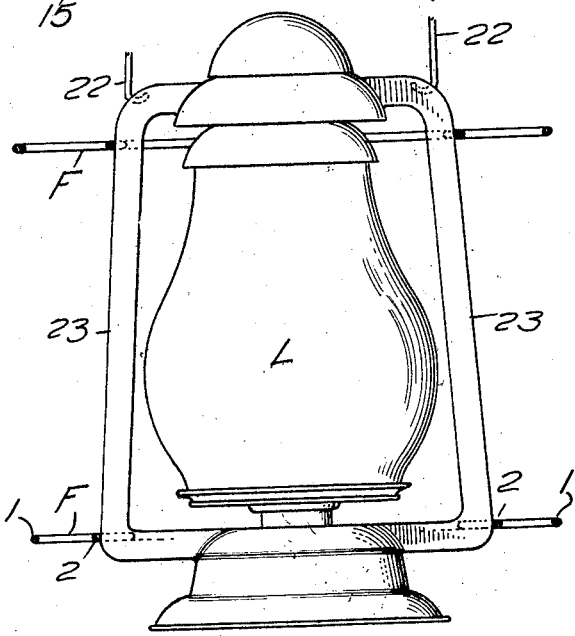
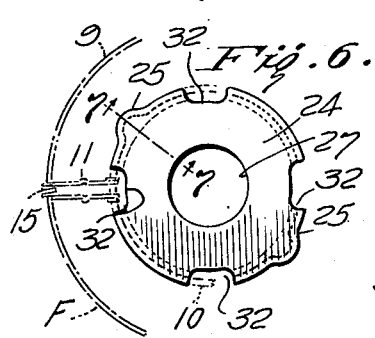
Inventor
WILLIAM R. GWATHMEY,
By Frank B. Hoffman
Attorney Patented July 15, 1930

1,770,737

UNITED STATES PATENT OFFICE

WILLIAM R. GWATHMEY, OF RUARK, VIRGINIA

INSECT TRAP

Application filed August 20, 1929. Serial No. 387,163.

This invention relates to new and useful improvements in insect traps or exterminators, and has for its principal object to provide a portable trap that can be quickly and readily suspended from any suitable support where the illuminating effect will be best presented to produce the greatest attraction, and which when so positioned will function to accomplish maximum results under varying weather conditions.

Another object of the invention is to provide a novel construction of wire frame which supports a plurality of removable reflector plates positioned radially of a central light giving medium, such as a lantern or an electric light, whereby the rays from the light will be reflected laterally in all directions over a considerable area.

Another object of the invention is to provide a novel construction of wire frame centrally of which is removably positioned a lantern or electric light that it will be firmly held in operative position irrespective of how much the frame may swing in suspended position under the force of strong winds.

A further object of the invention is to provide the wire frame at the top with supporting bails arranged at right angles to each other so as to form a rigid brace for the frame.

A still further object of the invention is to arrange the reflector plates radially of the light giving medium over the insect catching pan which is detachably suspended from the bottom of the wire frame so that the insects in flying towards the light will strike either the light reflecting plates or the light giving medium and then fall into the pan containing an insect destroying medium.

With these and other objects in view, the invention comprises the various novel features of construction, combination and arrangement of parts as will be more particularly described hereinafter and set forth in the appended claims.

Referring to the drawings:

Fig. 1 is a sectional elevation of my improved form of insect trap shown suspended from a wire standard adapted to be driven into the ground.

Fig. 2 is a detail perspective view of the upper portion of the wire frame of the trap.

Fig. 3 is a sectional plan view taken on the line 3—3 of Fig. 1

Fig. 4 is a vertical sectional view taken on the line 4—4 of Fig. 3.

Fig. 5 is a detail sectional elevation showing an electric light removably positioned centrally within the upper portion of the wire frame.

Fig. 6 is a detail plan view of the upper electric light supporting plate, and

Fig. 7 is an enlarged transverse sectional view taken on the line 7—7 of Fig. 6.

Referring more particularly to the drawings, the letter F indicates the frame of the trap which is made of strong, durable wire and consists of a bottom ring 1 and a smaller ring 2 arranged concentrically of the ring 1 and in the same horizontal plane. The ring 2 is firmly held suspended in this position by four strands of wire indicated by the number 3 connected to it and the outer ring at equal distant points. Each strand of wire 3 has one end wound around the inner ring 2 from where it extends outwardly as at 4 to the ring 1 at which point it is wound around the ring 1, and is then extended inwardly as at 5 in parallel relation to the portion 4 and has its terminal end wound around the inner ring 2. By reference to Fig. 3, it will be noted that the center parts of the portions 4 and 5 are crimped outwardly as at 6 to receive the terminal ends of saddle wires 7 which are coiled around the portions 4 and 5 of the wires 3 that act not only to support the ring 2 centrally of the ring 1, but also to stay the frame and hold it rigid under all working conditions. The saddle wires extend downwardly below the plane of the rings 1 and 2 so as to provide a saddle or supporting loop for each reflector plate 8, the latter being preferably made of plain window pane glass as it possesses the greatest light-reflecting capabilities. By virtue of the particular connections of the saddle wires, that is, together with the parallel portions 4 and 5 of the supporting wires 3 are so arranged as to snugly receive and hold lower ends of the reflector plates in their proper position and against displacement under any and all operating conditions.

Arranged above and in vertical alinement with rings 1 and 2 are similar rings 9 and 10, the latter being disposed concentrically of and in the same plane as the ring 9. Ring 10, like the ring 2, is supported in this position by supporting wires 11, that are arranged in vertical alinement with the supporting wires 3. Each of these wires has one terminal end wound around the ring 10, from where it extends outwardly as at 12, to the ring 9 at which point it is wound around the ring 9 and is then extended inwardly as at 13 in parallel relation to the portion 12 and is coiled at its terminal end around the ring 10, the space between the parallel portions being just sufficient to snugly but freely receive the upper ends of the glass reflector plates 8.

Each of the rings 2 and 10 is formed at diametrically opposite points with outwardly flared portions 14 adapted to receive parts of the light giving medium L as will be more particularly described hereinafter. In order to firmly support the rings 1 and 9 in spaced vertical alinement, I provide vertical stay wires 15, each of which has its terminal end coiled around the rings 1 and 9 respectively. These wires are positioned as near the edge of each reflector plate as possible so as not to interfere with the reflected rays of light.

Bails 16 and 17 are fastened to the upper ring 9 in right-angle relation to each other, the former having a central downwardly extending crimp 18 to receive the portion of the other bail crossing it so as to provide a rigid connection, whereby the bails will always be firmly held in proper position and at the same time serve as an additional bracing means for the wire frame or cage. These bails are adapted to be positioned over a supporting hook 19 or any kind of suitable supporting means such as an iron standard that may be driven into the ground at any desired place.

Arranged beneath the wire frame is an insect catching pan 20 detachably supported by hooks or other suitable means 21 connected to the lower frame ring 1. The pan normally contains an approximate amount of water covered with oil or any other desired insect catching or destroying medium.

By reference to Fig. 1, it will appear that the light giving medium L in this instance is a standard form of kerosene lantern, preferably of that type that will not become extinguished in strong drafts or winds. The lantern is loosely but firmly supported centrally within the wire frame or cage by its own bail 22, which is also adapted to be positioned over the supporting hook 19. In order to position the lantern as shown the pan 20 is detached so that the lantern can be shoved up into the frame until the side bars 23 snugly fit within the outwardly flared portions 14 of the upper and lower rings 2 and 10. The lantern bail and the frame bails are then placed over the supporting hook 19. By reason of the side bars 23 fitting in the outwardly flared portions 14, the lantern will be prevented from oscillatory movement independent of the frame when subjected to strong winds. After the lantern has been properly positioned in the frame, the pan 20 may then be again connected to the bottom of the frame.

In some instances, it may be more desirable and practicable to use an electric light giving medium and in this case I use a circular supporting plate 24, the outside diameter of which corresponds to that of the upper frame ring 10 and the under side of which is formed with oppositely disposed lugs 25 adapted to snugly seat within the outwardly flared portions 14 of the upper frame ring 9, whereby the plate is held against rotary movement. 26 is a similar plate that fits up against the bottom of the frame ring 10, and like the plate 24 is provided with a central opening 27 for the reception of a water-proof electric light socket 28, having a depending threaded shank 29 for the accommodation of a lock nut 30, by the tightening of which the two plates 24 and 26 can be clamped over the frame ring 10. 31 represents an ordinary electric light bulb screwed into the socket 28. Both of the plates 24 and 26 are formed with corresponding notches 32 adapted to receive the inner side edges of the reflector plates 8. From this construction it will be apparent that the electric light giving medium can be quickly and readily removed and replaced by a lantern when desired without in any way having to change or re-arrange the construction of the wire frame or cage.

From the foregoing it will be apparent that when the trap is hung up an an open space at night-time, the insects will be attracted by the light giving medium as well as by the rays of light reflected by the reflector plates, so that as they fly towards the light they will strike against the reflector plates or the light giving medium and thereby be precipitated into the insect destroying medium in the pan below.

What I claim is:

1. An insect trap comprising a wire frame embodying spaced upper and lower frame rings, means for supporting said rings in spaced relation to each other, a ring of smaller diameter than said upper and lower frame rings arranged concentrically of each upper and lower frame ring and in the same plane therewith, means for supporting said smaller rings in said concentric position, vertical reflector plates arranged radially between said upper and lower rings, means for supporting said reflector plates, a light giving medium arranged centrally within said concentrically disposed rings, and a pan detachably connected to the bottom frame ring and adapted to contain an insect destroying medium.

2. An insect trap comprising a wire frame embodying spaced upper and lower frame rings, means for supporting said rings in spaced relation to each other, a ring of smaller diameter than said upper and lower frame rings arranged concentrically of each upper and lower frame ring and in the same plane therewith, said concentrically arranged rings each formed with diametrically outwardly flared portions, means for supporting said last named rings concentrically of said frame rings, vertical reflector plates arranged radially between said upper and lower frame rings and the said concentrically disposed rings, means co-acting with said smaller ring supporting means to support said reflector plates, a light giving medium arranged centrally within said smaller rings, an insect catching pan connected to the lower frame ring, and means for suspending said wire frame in open space.

3. An insect trap comprising a wire frame embodying spaced upper and lower frame rings, means for supporting said rings in spaced relation to each other, a ring of smaller diameter than said upper and lower frame rings arranged concentrically of each upper and lower frame ring and in the same plane therewith, said concentrically arranged rings each formed with diametrically outwardly flared portions, means for supporting said last named rings concentrically of said frame rings, vertical glass reflector plates removably arranged radially between said upper and lower frame rings and the said concentrically disposed rings, means carried by said smaller ring supporting means to support said glass reflector plates, a light giving medium removably suspended centrally within said smaller rings, and an insect catching pan detachably connected to the lower frame ring, and means for suspending said light giving medium and said wire frame substantially as described.

In testimony whereof I affix my signature.

WILLIAM R. GWATHMEY.